Figure 1:
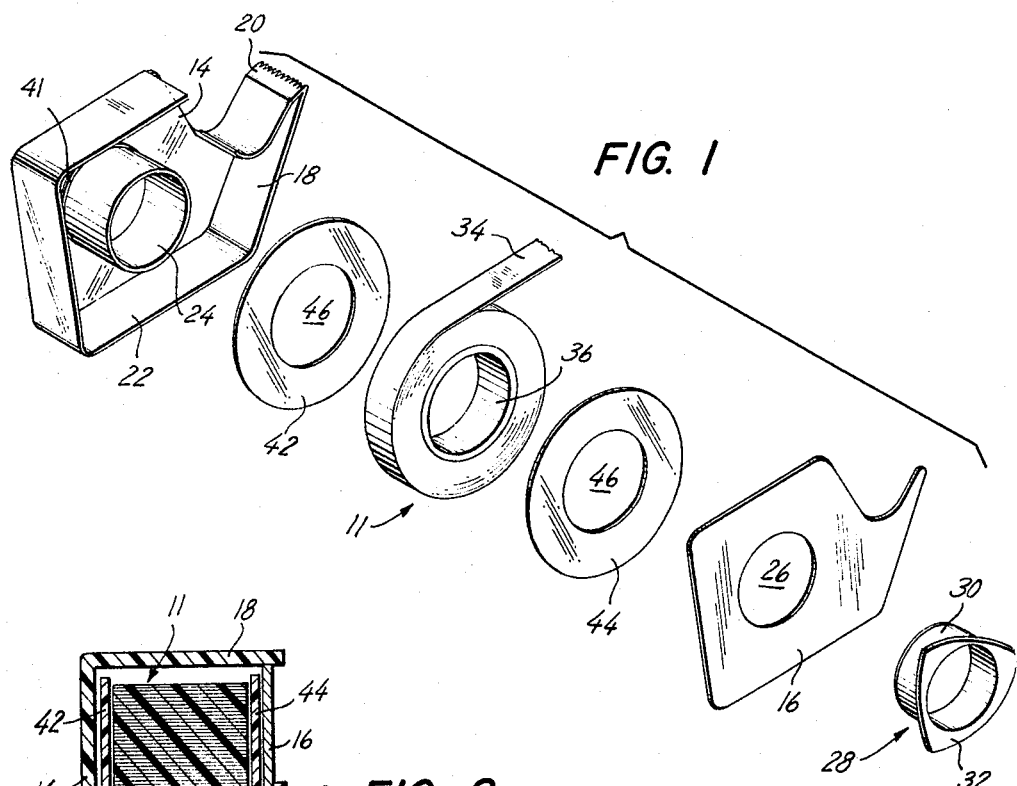

Aug. 2, 1966 J. R. HOLLINS 3,263,805
DISPENSER FOR PRESSURE SENSITIVE TAPE
Filed May 26, 1964

INVENTOR
JESSE R. HOLLINS

BY *Kinselstein, Kinselstein & Ottinger*

ATTORNEYS

United States Patent Office 3,263,805
Patented August 2, 1966

3,263,805
DISPENSER FOR PRESSURE SENSITIVE TAPE
Jesse R. Hollins, 1059 E. 22nd St., Brooklyn, N.Y.
Filed May 26, 1964, Ser. No. 370,267
2 Claims. (Cl. 206—52)

This invention relates to a dispenser for pressure sensitive tape and, more particularly, to a dispenser of the character described featuring mechanical means to facilitate the withdrawal of the tape from the container.

Conventional portable tape dispensers of the character described comprise a housing including two broad substantially flat parallel walls held apart by a short support. A long slender ribbon of the pressure sensitive tape is wound on a sleeve, so as to form a multi-turn roll of the tape. The roll of tape is placed in the housing with its sleeve journaled on the support for rotation about an axis perpendicular to the planes of the housing walls so that a length of tape can be unrolled from the dispenser and severed from the roll, when desired. For this purpose, a serrated edge is provided against which the tape can be easily cut, and which holds the free end of the tape. Often, the housing includes a base which makes the dispenser self-supporting on any flat surface.

One face of the tape includes a pressure-sensitive adhesive layer, or, optionally, both faces of the tape are finished to include pressure sensitive adhesive layers. The adhesive tapes referred to are completely conventional, and well-known brands thereof are Scotch Brand tape and Le Page's Cellophane Thriftape.

Since the dimensions of the tape dispenser are usually greater in radius (perpendicular to the axis of rotation of the roll) than width (parallel to the axis of the roll), the tape dispensers with their contained rolls of adhesive tape often are stored on their broad flat sides. This obtains both when large numbers of the tape dispensers are stored in cartons, as well as when an individual tape dispenser is stored, say, in a desk drawer.

In this position of the tape dispenser, i.e., lying on its side, one broad side of the roll slowly shifts down until it conforms to and rests against the interior face of one broad wall of the housing. In storage, especially in retail stores and in wholesalers' warehouses, the tape dispensers may be maintained in this position for substantial periods of time.

It has been observed that in this flat storage position, the side of the roll of tape defined by the edges of the tape and resting against the inside surface of the housing wall adheres strongly to said wall. Because the area of adherence is large, i.e., over the entire area of the side of the wall, the tape usually is so strongly adhered to the housing wall that the free end of the tape cannot be pulled out, and consequently the tape is not free to rotate within the housing so as to enable a user to remove lengths of tape therefrom as desired.

This defect of a side of the roll of tape sticking to a housing wall is thought to be caused by a cold flow over an extended time period of small quantities of the adhesive material from marginal portions of the face of the tape to the side of the tape and into contact with the housing wall. This may in part be due to the weight of the adhesive material which, when the tape roll is on its side, is enabled to flow vertically downwardly by the force of gravity aided by a squeezing effect on the adhesive layer generated by the winding of the tape under tension. It will be observed that the side of the tape roll is found sticky to the touch, in such instances.

As noted above, after storage periods, some convolutions of the tape roll shift with respect to others so that adjacent turns of the tape roll are slightly offset from one another. This exposes a very narrow marginal strip on shifted convolutions which enhances the foregoing difficulty.

The adherence of the tape roll to the housing wall makes the dispenser defective, causes return of dispensers to retail or wholesale sources of supply, and damages the business reputation of the manufacturer.

It is the primary object of my invention to provide mechanical means to prevent the adherence of a side of the tape roll to the interior surface of an adjacent wall of the container housing so as to enable a user of the item to withdraw lengths of adhesive tape therefrom even after extended periods of flat storage.

It is a further object of my invention to provide mechanical means of the character described which is extremely inexpensive and capable of mass production, and which adds insignificantly to the cost of the tape dispenser.

It is another object of my invention to provide mechanical means of the character described which can be incorporated into tape dispensers of the type described without requiring a redesign of the dispensers, and which will not affect the external appearance of the containers.

To this end, I provide two apertured discs or washers formed from sheet stock which are journaled on the support within the dispenser housing, each being located between a side of the tape roll and an adjacent interior surface of the housing wall. The washers preferably are identical in dimension and configuration, each preferably covers substantially the entire associated side area of the roll and to this end each has an outside diameter at least as large and desirably somewhat larger than the outside diameter of a fully wound roll of tape.

When stored in a flat position, the tape roll will adhere to one of the washers, rather than the housing wall. When a user attempts to unwind a length of tape, the washer rotates with the tape roll and is free to rotate with respect to the housing wall. For the length of tape to be unwound, only successive portions of the particular convolution being unrolled need be freed from its adherence to the washer, this being done in the natural course of removing the desired length of tape. The force required to do this due to the small area of adherence is only a small additional fraction to the light force required to unroll the adhesive tape from contact with the nonadhesive face of its next adjacent convolution.

Other objects of my invention in part will be obvious and in part will be pointed out hereafter.

My invention accordingly consists in the features of construction, combinations of elements and arrangements of parts which will be exemplified in the device hereinafter described and of which the scope of application will be indicated in the appended claims.

Figure 2:
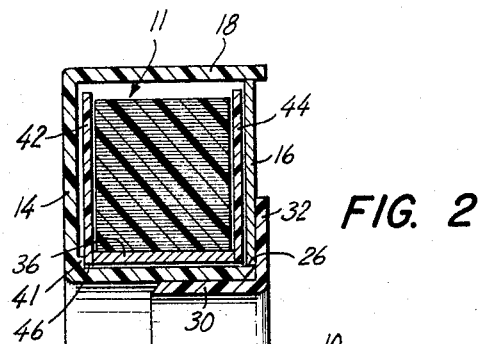
Figure 3:
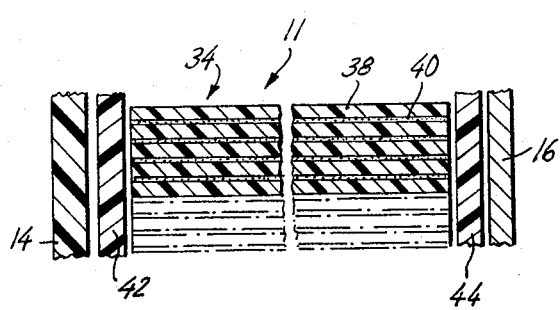

In the accompanying drawings, in which I have shown one of the various possible embodiments of my invention, FIG. 1 is an exploded view showing the several components of a dispenser for pressure sensitive tape and including the mechanical means of my invention;

FIG. 2 is an enlarged axial vertical sectional view of the aforementioned dispenser and adhesive tape, with its several components assembled; and FIG. 3 is a fragmentary enlarged axial sectional view especially illustrating the tape with its pressure sensitive adhesive face.

Referring now in detail to the drawings, the reference numeral 10 denotes a dispenser constructed in accordance with the present invention. The dispenser contains and rotatably supports a roll of pressure sensitive adhesive tape 11. Said dispenser includes a dispenser housing 12 which is completely conventional and well known to those skilled in the art. It is the portable, lightweight type commonly found in homes and offices. Although a specific type of dispenser housing 12 is illustrated in the drawings, it is evident that any dispenser housing of this general type will be suitable for incorporation with my invention.

The dispenser housing 12 may be formed from any well known material having the characteristics of light weight, durability, strength and toughness, a synthetic plastic commonly being used for all or the major part of this housing.

More specifically, the housing 12 includes two interconnected broad substantially flat walls, to wit, a left wall 14 and a right wall 16. The terms "left" and "right" are used herein only for convenience, and are, of course, dependent upon the point of view taken of the illustrated dispenser. The walls 14, 16 are generally parallel, coextensive, and of similar configuration. In the embodiment shown, the peripheries of the walls 14, 16 are joined by a flange 18 of uniform width which projects inwardly perpendicularly from and is integral with the left wall 14. The flange 18 runs for essentially the entire length of the border of the wall to which it is attached. It should be mentioned at this point that both walls may be of the same material, or, optionally, the wall which is integral with the flange may be of a transparent plastic material, and the other wall may be paperboard or chipboard and have imprinted thereon advertising indicia. The latter form of the dispenser is illustrated in the drawings.

As is standard in such portable home or office type tape dispensers 10, a portion of the housing includes a serrated edge 20 comprising a row of blunt-edged teeth against which the adhesive tape may be conveniently severed by a user thereof when a length is unwound from the tape roll. The edge 20 has a rearward flat portion of the flange 18 behind the teeth on which the free end of the adhesive tape may be held after severance. The flange 18 is interrupted in back of the edge 20 to permit the tape to be withdrawn from the housing.

Further, as an integral part of the housing 12, a lower horizontal portion of the flange 18 acts as a base 22 on which the tape dispenser may rest and is thus made self-supporting on any flat surface such as a shelf or a desk.

It will be noted that the tape dispenser is substantially greater in its radial dimension than in its width. The shape of the dispenser thereby lends itself to storage flat on one of its sides, both when large quantities of dispensers are packed in cartons as well as when an individual dispenser is temporarily stored in, say, a desk drawer.

The dispenser has a support 24 between the broad flat walls of the tape dispenser housing, and in the illustrated embodiment of my invention, said support comprises a stubby hollow tube of circular cross-section. The support is in one piece with the left housing wall 14 and projects centrally inwardly therefrom.

In one type of conventional tape dispenser as shown in the illustrated embodiment of my invention, one of the tape dispenser walls, here the right wall 16, has an outline which fits snugly within the outline formed by the outward margin of the essentially continuous flange 18. The flange extends slightly further from the left wall than does the tubular support. The right wall 16 has a through aperture 26 of a diameter to fit snugly over the outside diameter of the tubular support 24. The right wall 16 fits frictionally within the outline of the margin of the flange 18 and its central aperture 26 fits over the outer surface of the tubular support 24.

The components of the housing are held together by a retainer 28. The retainer has a hollow inwardly extending shank 30 which fits frictionally within the interior surface of the tubular support 24 and has an overhanging lip 32 which, when the components are assembled, presses against the exterior surface of the right wall 16 so as to hold said wall in its proper location. The assembly of the several components of the dispenser is most clearly illustrated in FIG. 2.

The dispenser is constructed and arranged to be used with a conventional roll 11 of pressure sensitive adhesive tape. The roll 11 is formed by winding a long slender ribbon 34 of thin flexible plastic tape on a sleeve 36, usually of paperboard. A multitude of convolutions of the tape are wound continuously to form a multi-turn roll.

The tape itself, as illustrated most clearly in FIG. 3, comprises a flexible thin plastic carrier base 38 and a layer of pressure sensitive adhesive 40 on one of the faces of the base. Tape having pressure sensitive adhesive layers on both faces of the base, the adhesive faces of adjacent convolutions being held apart by the usual separator strip, can also be utilized. The tape is wound so that the adhesive face of one convolution is in juxtaposition to a non-adhesive face of a radially inner adjacent convolution. Scotch Brand tape and Le Page's Cellophane Thriftape are well known commercially available examples of the aforementioned tape roll. A raised shoulder 41 may circumscribe the base of the tubular support 24, this being an expedient heretofore employed to space the side surface of the tape roll 11 from the adjacent wall of the dispenser. This has, at best, been a makeshift, since when the dispenser is stored with such wall lowermost the convolutions of the roll slowly shift until this side surface of the wall conforms and adheres to this wall. Nevertheless, the presence of this shoulder, or its absence, does not noticeably affect the operation of my invention.

In accordance with my invention, and to remedy the defect in the prior art adhesive tape dispensers hereinabove discussed, I provide two apertured discs or washers 42, 44 of preferably like dimensions and configuration. Each washer has a central aperture 46 sufficiently large so that it can easily fit over and freely rotate on the tubular support 24. The outside diameter of each washer is preferably at least as large as the outside diameter of a fully wound roll 11 of tape and desirably is slightly larger than said roll.

The washers can be mass-produced from any inexpensive material and are preferably formed from sheet stock of said material. Said washers may be made of any conventional plastic, paperboard stock, metallic foil, and preferably are of sufficient internal strength so as to be self-form-maintaining. To maximize the advantages of my invention the side of the washer facing the roll is smooth and nonabsorbent, this being inherent in metal foil and plastic, and obtained by treatment, e.g., glazing with paperboard. In addition, although not essential, the aforesaid side of the washer can be provided with a release coating, e.g., of silicone or Quilon. The thickness of the washers is of little consequence, except that the washers should be thick enough to meet the aforementioned requirement of being self-form-maintaining, yet should not be so thick as to occupy a disproportionate amount of space within the container housing.

Each of the washers is substantially coextensive with the area of one of the sides of the fully wound roll (the area defined by the edges of the tape convolutions), so that when the components of the dispenser 10 are assembled, each washer will prevent contact of any portion of the side of the roll of tape against the associated adjacent housing wall, regardless of the time it is stored flat.

In assembly of the several components of my invention, first one washer 42 is placed over the tubular support, the washer as has been said being free to rotate on said support. This washer prevents contact between the interior surface of the left wall 14 of the housing and the associated adjacent side of the tape roll. Next, the roll 11 of tape is placed over the tubular support, and is journalled on the support so that it may rotate about an axis coincident with the central axis of the support and generally perpendicular to the plane of the housing wall. Third, the next or second washer 44 is placed onto the tubular support, the washer being likewise free to rotate on said support. This washer prevents any contact between the adjacent side of the tape roll and the interior surface of the right housing wall 16. Finally, the right wall 16 and the retainer 28 are emplaced so that the housing for the roll of tape is now fully assembled and complete.

Should the dispenser be stored on its side long enough for the roll to have become immobilized if the washers were not present, this defect will no longer be present because the lower side of the roll now will adhere only to an adjacent washer or, if the tape dispenser were stored first upon one side and then upon another side, the tape roll may adhere to both washers 42, 44. In either instance, when it is desired to withdraw a length of tape from the roll, both washers 42, 44 are free to turn together with the roll of tape relative to the walls of the housing. Only a relatively light force, which force is only an additional slight pull in addition to the pull necessary to unwind a length of tape from its adjacent convolution, is necessary to pull away the edge (or edges) of successive lengths of tape from adhesive contact with the washer, this slight additional pull being hardly even noticeable in the normal course of unwinding a length of tape. I have thereby eliminated the possibility of one entire side or both sides of the tape roll strongly adhering to one or both of the housing walls, and I have thereby achieved the several objects of my invention.

As various possible embodiments might be made of the above invention and as various changes might be made in the embodiment above set forth, it is to be understood that all matter herein described or shown in the accompanying drawings is to be interpreted as illustrative and not in a limiting sense.

Having thus described my invention, I claim as new and desire to secure by Letters Patent:

1. A portable pressure-sensitive adhesive tape dispenser, said dispenser including a multi-convoluted wound roll of tape, the diameter of the roll being greater than the width of the roll, the roll having a pair of spaced opposed circular side faces defined by the edges of the convolutions of the tape, at least the radially inward face of the tape being covered by a layer of a pressure-sensitive adhesive, a member about which the tape is wound, a housing containing and rotatably carrying the roll of tape, said housing comprising two broad substantially flat spaced generally parallel interconnected walls, a support intermediate the walls on which the member of the tape roll is journalled for rotation about an axis generally perpendicular to the walls and a washer freely rotatable coaxially of the roll with respect to the roll and the support and interposed between a side face of the tape roll and an interior surface of the housing wall, the washer having a diameter sufficiently large to substantially cover the adjacent side face of the roll, a side face of the tape roll overlying the washer when the tape dispenser is stored with the walls of the housing substantially horizontal and after a passage of time becoming sticky by the exposure of the pressure-sensitive adhesive at said side face, and said side face adhering to the interior face of said washer, the washer thereupon adhering to and rotating with the roll of tape and thereby preventing inoperativeness of the dispenser caused by adherence of the sticky face of the roll to the housing wall, the outermost convolution of the tape being freed from edgewise adherence to the washer as it is unwound from the roll.

2. A portable tape dispenser as set forth in claim 1 wherein there are two like washers similarly mounted within the housing, each being interposed between an adjacent side face of the tape roll and an interior surface of the adjacent housing wall.

References Cited by the Examiner

UNITED STATES PATENTS

| | | | |
|---|---|---|---|
| 1,112,062 | 9/1914 | Gardner | 206—52 |
| 2,927,710 | 3/1960 | Raber | 206—52 |

THERON E. CONDON, *Primary Examiner.*

LOUIS G. MANCENE, *Examiner.*

W. T. DIXSON, *Assistant Examiner.*